(12) United States Patent  
Galor et al.

(10) Patent No.: US 8,959,013 B2
(45) Date of Patent: *Feb. 17, 2015

(54) VIRTUAL KEYBOARD FOR A NON-TACTILE THREE DIMENSIONAL USER INTERFACE

(75) Inventors: Micha Galor, Tel Aviv (IL); Ofir Or, Ramat Gan (IL); Shai Litvak, Beit Hashmonai (IL); Erez Sali, Savyon (IL)

(73) Assignee: Apple Inc., Cupertino, CA (US)

( * ) Notice: Subject to any disclaimer, the term of this patent is extended or adjusted under 35 U.S.C. 154(b) by 376 days.

This patent is subject to a terminal disclaimer.

(21) Appl. No.: 13/244,490

(22) Filed: Sep. 25, 2011

(65) Prior Publication Data

US 2012/0078614 A1   Mar. 29, 2012

Related U.S. Application Data

(60) Provisional application No. 61/386,591, filed on Sep. 27, 2010.

(51) Int. Cl.
*G06F 17/28* (2006.01)
*G06F 17/20* (2006.01)
*G06F 17/27* (2006.01)
(Continued)

(52) U.S. Cl.
CPC .............. *G06F 3/0233* (2013.01); *G06F 3/011* (2013.01); *G06F 17/276* (2013.01)
USPC ................ 704/9; 704/2; 704/3; 704/4; 704/5; 704/6; 704/7; 704/8; 704/10; 382/154; 382/106; 382/190; 382/103; 715/863; 715/702; 715/773; 345/168; 345/156; 345/173; 345/441; 345/177; 345/158; 345/174; 345/169

(58) Field of Classification Search
USPC ......... 345/168, 156, 173, 441, 177, 158, 174, 345/169; 382/154, 106, 190, 103; 715/863, 715/702, 773; 704/2–10
See application file for complete search history.

(56) References Cited

U.S. PATENT DOCUMENTS

| 4,550,250 A | 10/1985 | Mueller et al. |
| 4,789,921 A | 12/1988 | Aho |

(Continued)

FOREIGN PATENT DOCUMENTS

| WO | 9935633 A2 | 7/1999 |
| WO | 03071410 A2 | 8/2003 |

(Continued)

OTHER PUBLICATIONS

International Application PCT/IB2012/050577 Search Report dated Aug. 6, 2012.

(Continued)

*Primary Examiner* — Paras D Shah
*Assistant Examiner* — Anne Thomas-Homescu
(74) *Attorney, Agent, or Firm* — D. Kligler I.P. Services Ltd

(57) ABSTRACT

A method, including presenting, by a computer system executing a non-tactile three dimensional user interface, a virtual keyboard on a display, the virtual keyboard including multiple virtual keys, and capturing a sequence of depth maps over time of a body part of a human subject. On the display, a cursor is presented at positions indicated by the body part in the captured sequence of depth maps, and one of the multiple virtual keys is selected in response to an interruption of a motion of the presented cursor in proximity to the one of the multiple virtual keys.

27 Claims, 3 Drawing Sheets

(51) Int. Cl.

| | | |
|---|---|---|
| *G06F 17/21* | (2006.01) | |
| *G06F 3/01* | (2006.01) | |
| *G06F 3/048* | (2013.01) | |
| *G06F 3/02* | (2006.01) | |
| *G06F 3/043* | (2006.01) | |
| *G06F 3/041* | (2006.01) | |
| *G06F 3/033* | (2013.01) | |
| *G06F 3/045* | (2006.01) | |
| *G06F 3/023* | (2006.01) | |
| G09G 5/08 | (2006.01) | |
| G09G 5/00 | (2006.01) | |
| G06T 11/20 | (2006.01) | |
| G06K 9/00 | (2006.01) | |
| G06K 9/46 | (2006.01) | |
| G06K 9/66 | (2006.01) | |

(56) References Cited

U.S. PATENT DOCUMENTS

| | | | |
|---|---|---|---|
| 4,988,981 | A | 1/1991 | Zimmerman et al. |
| 5,495,576 | A | 2/1996 | Ritchey |
| 5,588,139 | A | 12/1996 | Lanier et al. |
| 5,594,469 | A | 1/1997 | Freeman et al. |
| 5,846,134 | A | 12/1998 | Latypov |
| 5,852,672 | A | 12/1998 | Lu |
| 5,862,256 | A | 1/1999 | Zetts et al. |
| 5,864,635 | A | 1/1999 | Zetts et al. |
| 5,870,196 | A | 2/1999 | Lulli et al. |
| 5,917,937 | A | 6/1999 | Szeliski et al. |
| 5,973,700 | A | 10/1999 | Taylor et al. |
| 6,002,808 | A | 12/1999 | Freeman |
| 6,084,979 | A | 7/2000 | Kanade et al. |
| 6,243,054 | B1 | 6/2001 | DeLuca |
| 6,252,988 | B1 | 6/2001 | Ho |
| 6,256,033 | B1 | 7/2001 | Nguyen |
| 6,262,740 | B1 | 7/2001 | Lauer et al. |
| 6,345,111 | B1 | 2/2002 | Yamaguchi et al. |
| 6,345,893 | B2 | 2/2002 | Fateh et al. |
| 6,452,584 | B1 | 9/2002 | Walker et al. |
| 6,456,262 | B1 | 9/2002 | Bell |
| 6,507,353 | B1 | 1/2003 | Huard et al. |
| 6,512,838 | B1 * | 1/2003 | Rafii et al. ............... 382/106 |
| 6,519,363 | B1 | 2/2003 | Su et al. |
| 6,559,813 | B1 | 5/2003 | DeLuca et al. |
| 6,611,252 | B1 * | 8/2003 | DuFaux ................... 345/168 |
| 6,614,422 | B1 * | 9/2003 | Rafii et al. ............... 345/168 |
| 6,681,031 | B2 | 1/2004 | Cohen et al. |
| 6,686,921 | B1 | 2/2004 | Rushmeier et al. |
| 6,690,370 | B2 | 2/2004 | Ellenby et al. |
| 6,741,251 | B2 | 5/2004 | Malzbender |
| 6,791,540 | B1 | 9/2004 | Baumberg |
| 6,803,928 | B2 | 10/2004 | Bimber et al. |
| 6,853,935 | B2 | 2/2005 | Satoh et al. |
| 6,857,746 | B2 | 2/2005 | Dyner |
| 6,977,654 | B2 | 12/2005 | Malik et al. |
| 7,003,134 | B1 | 2/2006 | Covell et al. |
| 7,013,046 | B2 | 3/2006 | Kawamura et al. |
| 7,023,436 | B2 | 4/2006 | Segawa et al. |
| 7,042,440 | B2 | 5/2006 | Pryor et al. |
| 7,042,442 | B1 * | 5/2006 | Kanevsky et al. ........ 345/169 |
| 7,151,530 | B2 * | 12/2006 | Roeber et al. ............ 345/168 |
| 7,170,492 | B2 | 1/2007 | Bell |
| 7,215,815 | B2 | 5/2007 | Honda |
| 7,227,526 | B2 | 6/2007 | Hildreth et al. |
| 7,250,938 | B2 * | 7/2007 | Kirkland et al. ......... 345/168 |
| 7,259,747 | B2 | 8/2007 | Bell |
| 7,264,554 | B2 | 9/2007 | Bentley |
| 7,289,227 | B2 | 10/2007 | Smetak et al. |
| 7,301,648 | B2 | 11/2007 | Foxlin |
| 7,302,099 | B2 | 11/2007 | Zhang et al. |
| 7,333,113 | B2 | 2/2008 | Gordon |
| 7,340,077 | B2 * | 3/2008 | Gokturk et al. .......... 382/103 |
| 7,348,963 | B2 | 3/2008 | Bell |
| 7,358,972 | B2 | 4/2008 | Gordon et al. |
| 7,370,883 | B2 | 5/2008 | Basir et al. |
| 7,378,585 | B2 * | 5/2008 | McGregor .................... 84/600 |
| 7,382,356 | B2 * | 6/2008 | Parker et al. ............. 345/168 |
| 7,427,996 | B2 | 9/2008 | Yonezawa et al. |
| 7,428,542 | B1 | 9/2008 | Fink et al. |
| 7,474,256 | B2 | 1/2009 | Ohta et al. |
| 7,526,120 | B2 * | 4/2009 | Gokturk et al. .......... 382/154 |
| 7,536,032 | B2 | 5/2009 | Bell |
| RE40,880 | E * | 8/2009 | DuFaux ................... 345/168 |
| 7,573,480 | B2 | 8/2009 | Gordon |
| 7,576,727 | B2 | 8/2009 | Bell |
| 7,580,572 | B2 | 8/2009 | Bang et al. |
| 7,590,941 | B2 | 9/2009 | Wee et al. |
| 7,688,998 | B2 | 3/2010 | Tuma et al. |
| 7,696,876 | B2 | 4/2010 | Dimmer et al. |
| 7,724,250 | B2 | 5/2010 | Ishii et al. |
| 7,762,665 | B2 | 7/2010 | Vertegaal et al. |
| 7,774,075 | B2 * | 8/2010 | Lin .............................. 700/17 |
| 7,774,155 | B2 | 8/2010 | Sato et al. |
| 7,812,842 | B2 | 10/2010 | Gordon |
| 7,821,541 | B2 | 10/2010 | Delean |
| 7,834,847 | B2 * | 11/2010 | Boillot et al. ............ 345/156 |
| 7,840,031 | B2 | 11/2010 | Albertson et al. |
| 7,844,914 | B2 * | 11/2010 | Andre et al. .............. 715/773 |
| 7,925,549 | B2 | 4/2011 | Looney et al. |
| 7,971,156 | B2 | 6/2011 | Albertson et al. |
| 8,166,421 | B2 * | 4/2012 | Magal et al. .............. 715/863 |
| 8,199,104 | B2 * | 6/2012 | Park et al. ................ 345/156 |
| 8,230,367 | B2 * | 7/2012 | Bell et al. ................. 715/863 |
| 8,232,973 | B2 * | 7/2012 | Kocienda et al. ........ 345/173 |
| 8,368,647 | B2 | 2/2013 | Lin |
| 8,514,221 | B2 | 8/2013 | King et al. |
| 2002/0057383 | A1 | 5/2002 | Iwamura |
| 2002/0071607 | A1 | 6/2002 | Kawamura et al. |
| 2002/0158873 | A1 | 10/2002 | Williamson |
| 2003/0057972 | A1 | 3/2003 | Pfaff et al. |
| 2003/0063775 | A1 * | 4/2003 | Rafii et al. ............... 382/106 |
| 2003/0088463 | A1 | 5/2003 | Kanevsky et al. |
| 2003/0156756 | A1 * | 8/2003 | Gokturk et al. .......... 382/190 |
| 2003/0185444 | A1 | 10/2003 | Honda |
| 2003/0235341 | A1 | 12/2003 | Gokturk et al. |
| 2004/0046744 | A1 | 3/2004 | Rafii et al. |
| 2004/0104935 | A1 | 6/2004 | Williamson |
| 2004/0135744 | A1 | 7/2004 | Bimber et al. |
| 2004/0174770 | A1 | 9/2004 | Rees |
| 2004/0183775 | A1 | 9/2004 | Bell |
| 2004/0184640 | A1 | 9/2004 | Bang et al. |
| 2004/0184659 | A1 | 9/2004 | Bang et al. |
| 2004/0258314 | A1 | 12/2004 | Hashimoto |
| 2005/0031166 | A1 | 2/2005 | Fujimura et al. |
| 2005/0088407 | A1 | 4/2005 | Bell et al. |
| 2005/0089194 | A1 | 4/2005 | Bell |
| 2005/0110964 | A1 | 5/2005 | Bell et al. |
| 2005/0122308 | A1 | 6/2005 | Bell et al. |
| 2005/0162381 | A1 | 7/2005 | Bell et al. |
| 2005/0190972 | A1 | 9/2005 | Thomas et al. |
| 2005/0254726 | A1 | 11/2005 | Fuchs et al. |
| 2005/0265583 | A1 | 12/2005 | Covell et al. |
| 2006/0010400 | A1 | 1/2006 | Dehlin et al. |
| 2006/0092138 | A1 | 5/2006 | Kim et al. |
| 2006/0110008 | A1 | 5/2006 | Vertegaal et al. |
| 2006/0115155 | A1 | 6/2006 | Lui et al. |
| 2006/0139314 | A1 | 6/2006 | Bell |
| 2006/0149737 | A1 | 7/2006 | Du et al. |
| 2006/0159344 | A1 | 7/2006 | Shao et al. |
| 2006/0187196 | A1 | 8/2006 | Underkoffler et al. |
| 2006/0239670 | A1 | 10/2006 | Cleveland |
| 2006/0248475 | A1 | 11/2006 | Abrahamsson |
| 2007/0078552 | A1 | 4/2007 | Rosenberg |
| 2007/0154116 | A1 | 7/2007 | Shieh |
| 2007/0230789 | A1 | 10/2007 | Chang et al. |
| 2008/0062123 | A1 | 3/2008 | Bell |
| 2008/0094371 | A1 | 4/2008 | Forstall et al. |
| 2008/0123940 | A1 | 5/2008 | Kundu et al. |
| 2008/0150890 | A1 | 6/2008 | Bell et al. |
| 2008/0150913 | A1 | 6/2008 | Bell et al. |
| 2008/0170776 | A1 | 7/2008 | Albertson et al. |
| 2008/0236902 | A1 | 10/2008 | Imaizumi |

(56) References Cited

U.S. PATENT DOCUMENTS

| | | |
|---|---|---|
| 2008/0252596 A1 | 10/2008 | Bell et al. |
| 2008/0256494 A1 | 10/2008 | Greenfield |
| 2008/0260250 A1 | 10/2008 | Vardi |
| 2008/0287189 A1 | 11/2008 | Rabin |
| 2009/0009593 A1 | 1/2009 | Cameron et al. |
| 2009/0027335 A1 | 1/2009 | Ye |
| 2009/0027337 A1 | 1/2009 | Hildreth |
| 2009/0031240 A1 | 1/2009 | Hildreth |
| 2009/0040215 A1 | 2/2009 | Afzulpurkar et al. |
| 2009/0077504 A1 | 3/2009 | Bell |
| 2009/0078473 A1 | 3/2009 | Overgard et al. |
| 2009/0083122 A1 | 3/2009 | Angell et al. |
| 2009/0083622 A1 | 3/2009 | Chien et al. |
| 2009/0096783 A1 | 4/2009 | Shpunt et al. |
| 2009/0183125 A1* | 7/2009 | Magal et al. ............ 715/863 |
| 2009/0195392 A1 | 8/2009 | Zalewski |
| 2009/0228841 A1 | 9/2009 | Hildreth |
| 2009/0256817 A1* | 10/2009 | Perlin et al. ............ 345/174 |
| 2009/0297028 A1 | 12/2009 | De Haan |
| 2010/0002936 A1 | 1/2010 | Khomo et al. |
| 2010/0007717 A1* | 1/2010 | Spektor et al. ............ 348/43 |
| 2010/0034457 A1* | 2/2010 | Berliner et al. ............ 382/154 |
| 2010/0036717 A1 | 2/2010 | Trest |
| 2010/0053151 A1 | 3/2010 | Marti et al. |
| 2010/0071965 A1* | 3/2010 | Hu et al. ............ 178/18.06 |
| 2010/0149096 A1 | 6/2010 | Migos et al. |
| 2010/0164897 A1* | 7/2010 | Morin et al. ............ 345/173 |
| 2010/0177933 A1 | 7/2010 | Willmann et al. |
| 2010/0199226 A1* | 8/2010 | Nurmi ............ 715/863 |
| 2010/0199228 A1 | 8/2010 | Latta et al. |
| 2010/0234094 A1 | 9/2010 | Gagner et al. |
| 2010/0235786 A1 | 9/2010 | Meizels et al. |
| 2010/0302165 A1* | 12/2010 | Li ............ 345/168 |
| 2010/0328209 A1* | 12/2010 | Nakao ............ 345/157 |
| 2011/0006978 A1 | 1/2011 | Yuan |
| 2011/0018795 A1 | 1/2011 | Jang |
| 2011/0029918 A1 | 2/2011 | Yoo et al. |
| 2011/0052006 A1* | 3/2011 | Gurman et al. ............ 382/103 |
| 2011/0063231 A1* | 3/2011 | Jakobs et al. ............ 345/173 |
| 2011/0081072 A1* | 4/2011 | Kawasaki et al. ............ 382/154 |
| 2011/0084914 A1* | 4/2011 | Zalewski ............ 345/173 |
| 2011/0164032 A1 | 7/2011 | Shadmi |
| 2011/0164141 A1 | 7/2011 | Tico et al. |
| 2011/0193939 A1 | 8/2011 | Vassigh et al. |
| 2011/0211754 A1 | 9/2011 | Litvak et al. |
| 2011/0225536 A1* | 9/2011 | Shams et al. ............ 715/773 |
| 2011/0227820 A1* | 9/2011 | Haddick et al. ............ 345/156 |
| 2011/0231757 A1* | 9/2011 | Haddick et al. ............ 715/702 |
| 2011/0248914 A1* | 10/2011 | Sherr ............ 345/156 |
| 2011/0248959 A1* | 10/2011 | Diehl ............ 345/175 |
| 2011/0254765 A1 | 10/2011 | Brand |
| 2011/0254798 A1* | 10/2011 | Adamson et al. ............ 345/173 |
| 2011/0260965 A1 | 10/2011 | Kim et al. |
| 2011/0261058 A1* | 10/2011 | Luo ............ 345/441 |
| 2011/0279397 A1* | 11/2011 | Rimon et al. ............ 345/173 |
| 2011/0291926 A1* | 12/2011 | Gokturk et al. ............ 345/158 |
| 2011/0292036 A1 | 12/2011 | Sali et al. |
| 2011/0293137 A1 | 12/2011 | Gurman et al. |
| 2011/0304541 A1* | 12/2011 | Dalal ............ 345/158 |
| 2011/0310010 A1 | 12/2011 | Hoffnung et al. |
| 2012/0001875 A1* | 1/2012 | Li et al. ............ 345/177 |
| 2012/0078614 A1 | 3/2012 | Galor et al. |
| 2012/0169583 A1 | 7/2012 | Rippel et al. |
| 2012/0202569 A1* | 8/2012 | Maizels et al. ............ 463/3 |
| 2012/0204133 A1* | 8/2012 | Guendelman et al. ........ 715/863 |
| 2012/0223882 A1 | 9/2012 | Galor et al. |
| 2012/0274553 A1* | 11/2012 | Kang ............ 345/156 |
| 2012/0313848 A1 | 12/2012 | Galor et al. |
| 2013/0014052 A1 | 1/2013 | Frey et al. |
| 2013/0027341 A1* | 1/2013 | Mastandrea ............ 345/173 |
| 2013/0044053 A1 | 2/2013 | Galor et al. |
| 2013/0055120 A1 | 2/2013 | Galor et al. |
| 2013/0055150 A1 | 2/2013 | Galor |
| 2013/0058565 A1* | 3/2013 | Rafii et al. ............ 382/154 |
| 2013/0106692 A1* | 5/2013 | Maizels et al. ............ 345/156 |
| 2013/0107021 A1* | 5/2013 | Maizels et al. ............ 348/50 |
| 2013/0154928 A1* | 6/2013 | Chang ............ 345/157 |
| 2013/0155070 A1* | 6/2013 | Luo ............ 345/441 |
| 2013/0207920 A1* | 8/2013 | McCann et al. ............ 345/173 |
| 2013/0241823 A1* | 9/2013 | Pryor ............ 345/156 |
| 2013/0314303 A1* | 11/2013 | Osterhout et al. ............ 345/8 |
| 2014/0015757 A1* | 1/2014 | Li ............ 345/168 |
| 2014/0063054 A1* | 3/2014 | Osterhout et al. ............ 345/633 |
| 2014/0063055 A1* | 3/2014 | Osterhout et al. ............ 345/633 |

FOREIGN PATENT DOCUMENTS

| | | |
|---|---|---|
| WO | 2004107272 A1 | 12/2004 |
| WO | 2005003948 A1 | 1/2005 |
| WO | 2005094958 A1 | 10/2005 |
| WO | 2007043036 A1 | 4/2007 |
| WO | 2007078639 A1 | 7/2007 |
| WO | 2007105205 A2 | 9/2007 |
| WO | 2007132451 A2 | 11/2007 |
| WO | 2007135376 A2 | 11/2007 |
| WO | 2008120217 A2 | 10/2008 |
| WO | 2012011044 A1 | 1/2012 |
| WO | 2012020380 A1 | 2/2012 |
| WO | 2012107892 A1 | 8/2012 |

OTHER PUBLICATIONS

U.S. Appl. No. 12/683,452 Official Action dated Sep. 7, 2012.

Koutek, M., "Scientific Visualization in Virtual Reality: Interaction Techniques and Application Development", PhD Thesis, Delft University of Technology, 264 pages, Jan. 2003.

Azuma et al., "Recent Advances in Augmented Reality", IEEE Computer Graphics and Applications, vol. 21, issue 6, pp. 34-47, Nov. 2001.

Breen et al., "Interactive Occlusion and Collision of Real and Virtual Objects in Augmented Reality", Technical Report ECRC-95-02, ECRC, Munich, Germany, 22 pages, year 1995.

Burdea et al., "A Distributed Virtual Environment with Dextrous Force Feedback", Proceedings of Interface to Real and Virtual Worlds Conference, pp. 255-265, Mar. 1992.

Gargallo et al., "Bayesian 3D Modeling from Images Using Multiple Depth Maps", Proceedings of the IEEE Computer Society Conference on Computer Vision and Pattern Recognition (CVPR'05), vol. 2, pp. 885-891, Jun. 20-25, 2005.

Gobbetti et al., "VB2: an Architecture for Interaction in Synthetic Worlds", Proceedings of the 6th Annual ACM Symposium on User Interface Software and Technology (UIST'93), pp. 167-178, Nov. 3-5, 1993.

Ohta et al., "Share-Z: Client/Server Depth Sensing for See-Through Head-Mounted Displays", Presence: Teleoperators and Virtual Environments, vol. 11, No. 2, pp. 176-188, Apr. 2002.

Schmalstieg et al., "The Studierstube Augmented Reality Project", Presence: Teleoperators and Virtual Environments, vol. 11, No. 1, pp. 33-54, Feb. 2002.

Sun et al., "SRP Based Natural Interaction Between Real and Virtual Worlds in Augmented Reality", Proceedings of the International Conference on Cyberworlds (CW'08), pp. 117-124, Sep. 22-24, 2008.

U.S. Appl. No. 13/541,786, filed Jul. 5, 2012.
U.S. Appl. No. 13/592,352, filed Aug. 23, 2012.
U.S. Appl. No. 13/584,831, filed Aug. 14, 2012.
U.S. Appl. No. 13/592,369, filed Aug. 23, 2012.
Miller, R., "Kinect for XBox 360 Review", Engadget, Nov. 4, 2010.
U.S. Appl. No. 13/161,508 Office Action dated Sep. 9, 2013.
International Application PCT/IB2013/052332 Search Report dated Aug. 26, 2013.
U.S. Appl. No. 13/314,210 Office Action dated Jul. 19, 2013.
U.S. Appl. No. 13/314,207 Office Action dated Aug. 5, 2013.
Hart, D., U.S. Appl. No. 09/616,606 "Method and System for High Resolution, Ultra Fast 3-D Imaging" filed on Jul. 14, 2000.
International Application PCT/IL2007/000306 Search Report dated Oct. 2, 2008.
International Application PCT/IL2007/000574 Search Report dated Sep. 10, 2008.

(56) References Cited

OTHER PUBLICATIONS

International Application PCT/IL2006/000335 Preliminary Report on Patentability dated Apr. 24, 2008.
Avidan et al., "Trajectory triangulation: 3D reconstruction of moving points from amonocular image sequence", IEEE Transactions on Pattern Analysis and Machine Intelligence (PAMI), vol. 22, No. 4, pp. 348-3537, Apr. 2000.
Leclerc et al., "The direct computation of height from shading", The Proceedings of the IEEE Computer Society Conference on Computer Vision and Pattern Recognition (CVPR), pp. 552-558, USA, Jun. 1991.
Zhang et al., "Shape from intensity gradient", IEEE Transactions on Systems, Man and Cybernetics—Part A: Systems and Humans, vol. 29, No. 3, pp. 318-325, May 1999.
Zhang et al., "Height recovery from intensity gradients", IEEE Computer Society Conference on Computer Vision and Pattern Recognition (CVPR), pp. 508-513, Jun. 21-23, 1994.
Horn, B., "Height and gradient from shading", International Journal of Computer Vision, vol. 5, No. 1, pp. 37-76, Aug. 1990.
Bruckstein, A., "On shape from shading", Computer Vision, Graphics & Image Processing, vol. 44, pp. 139-154, year 1988.
Zhang et al., "Rapid Shape Acquisition Using Color Structured Light and Multi-Pass Dynamic Programming", 1st International Symposium on 3D Data Processing Visualization and Transmission (3DPVT), Italy, Jul. 2002.
Besl, P., "Active, Optical Range Imaging Sensors", Machine vision and applications, vol. 1, pp. 127-152, year 1988.
Horn et al., "Toward optimal structured light patterns", Proceedings of International Conference on Recent Advances in 3D Digital Imaging and Modeling, pp. 28-37, Ottawa, Canada, May 1997.
Goodman, J.W., "Statistical Properties of Laser Speckle Patterns", Laser Speckle and Related Phenomena, pp. 9-75, Springer-Verlag, Berlin Heidelberg, 1975.
Asada et al., "Determining Surface Orientation by Projecting a Stripe Pattern", IEEE Transactions on Pattern Analysis and Machine Intelligence (PAMI), vol. 10, No. 5, pp. 749-754, Sep. 1988.
Winkelbach et al., "Shape from Single Stripe Pattern Illumination", Luc Van Gool (Editor), (DAGM 2002), Lecture Notes in Computer Science 2449, p. 240-247, Springer 2002.
Koninckx et al., "Efficient, Active 3D Acquisition, based on a Pattern-Specific Snake", Luc Van Gool (Editor), (DAGM 2002), Lecture Notes in Computer Science 2449, pp. 557-565, Springer 2002.
Kimmel et al., "Analyzing and synthesizing images by evolving curves with the Osher-Sethian method", International Journal of Computer Vision, vol. 24, No. 1, pp. 37-56, year 1997.
Zigelman et al., "Texture mapping using surface flattening via multi-dimensional scaling", IEEE Transactions on Visualization and Computer Graphics, vol. 8, No. 2, pp. 198-207, Apr. 2002.
Dainty, J.C., "Introduction", Laser Speckle and Related Phenomena, pp. 1-7, Springer-Verlag, Berlin Heidelberg, 1975.
Mendlovic et al., "Composite harmonic filters for scale, projection and shift invariant pattern recognition", Applied Optics Journal, vol. 34, No. 2, Jan. 10, 1995.
Fua et al., "Human Shape and Motion Recovery Using Animation Models", 19th Congress, International Society for Photogrammetry and Remote Sensing, Amsterdam, The Netherlands, Jul. 2000.
Allard et al., "Marker-less Real Time 3D modeling for Virtual Reality", Immersive Projection Technology, Iowa State University, year 2004.
Howe et al., "Bayesian Reconstruction of 3D Human Motion from Single-Camera Video", Advanced in Neural Information Processing Systems, vol. 12, pp. 820-826, USA 1999.
Li et al., "Real-Time 3D Motion Tracking with Known Geometric Models", Real-Time Imaging Journal, vol. 5, pp. 167-187, Academic Press 1999.
Grammalidis et al., "3-D Human Body Tracking from Depth Images Using Analysis by Synthesis", Proceedings of the IEEE International Conference on Image Processing (ICIP2001), pp. 185-188, Greece, Oct 7-10, 2001.

Segen et al., "Shadow gestures: 3D hand pose estimation using a single camera", Proceedings of IEEE International Conference on Computer Vision and Pattern Recognition, pp. 479-485, Fort Collins, USA, 1999.
Vogler et al., "ASL recognition based on a coupling between HMMs and 3D motion analysis", Proceedings of IEEE International Conference on Computer Vision, pp. 363-369, Mumbai, India, 1998.
Nam et al., "Recognition of Hand Gestures with 3D, Nonlinear Arm Movements", Pattern Recognition Letters, vol. 18, No. 1, pp. 105-113, Elsevier Science B.V. 1997.
Nesbat, S., "A System for Fast, Full-Text Entry for Small Electronic Devices", Proceedings of the 5th International Conference on Multimodal Interfaces, ICMI 2003, Vancouver, Nov. 5-7, 2003.
Ascension Technology Corporation, "Flock of Birds: Real-Time Motion Tracking", 2008.
Segen et al., "Human-computer interaction using gesture recognition and 3D hand tracking", ICIP 98, Proceedings of the IEEE International Conference on Image Processing, vol. 3, pp. 188-192, Oct. 4-7, 1998.
Dekker, L., "Building Symbolic Information for 3D Human Body Modeling from Range Data", Proceedings of the Second International Conference on 3D Digital Imaging and Modeling, IEEE computer Society, pp. 388-397, 1999.
Holte et al., "Gesture Recognition using a Range Camera", Technical Report CVMT-07-01 ISSN 1601-3646, Feb. 2007.
Cheng et al., "Articulated Human Body Pose Inference from Voxel Data Using a Kinematically Constrained Gaussian Mixture Model", CVPR EHuM2: 2nd Workshop on Evaluation of Articulated Human Motion and Pose Estimation, 2007.
U.S. Appl. No. 61/523,404, filed Aug. 15, 2011.
U.S. Appl. No. 61/504,339, filed Jul. 5, 2011.
U.S. Appl. No. 61/521,448, filed Aug. 9, 2011.
U.S. Appl. No. 61/523,349, filed Aug. 14, 2011.
Primesense, "Natural Interaction", YouTube Presentation, Jun. 9, 2010 http://www.youtube.com/watch?v=TzLKsex43zl~.
U.S. Appl. No. 13/423,322, filed Mar. 19, 2012.
U.S. Appl. No. 13/423,314, filed Mar. 19, 2012.
Tobii Technology, "The World Leader in Eye Tracking and Gaze Interaction", Mar. 2012.
Noveron, "Madison video eyewear", year 2012.
U.S. Appl. No. 12/762,336 Official Action dated May 15, 2012.
Manning et al., "Foundations of Statistical Natural Language Processing", chapters 6,7,9 and 12, MIT Press 1999.
Commission Regulation (EC) No. 1275/2008, Official Journal of the European Union, Dec. 17, 2008.
ARM Ltd., "AMBA Specification: AHB", Version 2, pp. 35-92, year 1999.
Primesense Corporation, "PrimeSensor NITE 1.1", USA, year 2010.
Microvision Inc., "PicoP® Display Engine—How it Works", 1996-2012.
Bleiwess et al., "Fusing Time-of-Flight Depth and Color for Real-Time Segmentation and Tracking", Dyn3D 2009, Lecture Notes in Computer Science 5742, pp. 58-69, Jena, Germany, Sep. 9, 2009.
Bleiwess et al., "Markerless Motion Capture Using a Single Depth Sensor", SIGGRAPH Asia 2009, Yokohama, Japan, Dec. 16-19, 2009.
Bevilacqua et al., "People Tracking Using a Time-of-Flight Depth Sensor", Proceedings of the IEEE International Conference on Video and Signal Based Surveillance, Sydney, Australia, Nov. 22-24, 2006.
Bradski, G., "Computer Vision Face Tracking for Use in a Perceptual User Interface", Intel Technology Journal, vol. 2, issue 2 (2nd Quarter 2008).
Comaniciu et al., "Kernel-Based Object Tracking", IEEE Transactions on Pattern Analysis and Machine Intelligence, vol. 25, No. 5, pp. 564-577, May 2003.
Gesturetec Inc., "Gesture Control Solutions for Consumer Devices", Canada, 2009.
Gokturk et al., "A Time-of-Flight Depth Sensor—System Description, Issues and Solutions", Proceedings of the 2004 Conference on Computer Vision and Patter Recognition Workshop (CVPRW'04), vol. 3, pp. 35, Jun. 27-Jul. 2, 2004.
Grest et al., "Single View Motion Tracking by Depth and Silhouette Information", SCIA 2007—Scandinavian Conference on Image

(56) References Cited

OTHER PUBLICATIONS

Analysis, Lecture Notes in Computer Science 4522, pp. 719-729, Aalborg, Denmark, Jun. 10-14, 2007.
Haritaoglu et al., "Ghost 3d: Detecting Body Posture and Parts Using Stereo", Proceedings of the IEEE Workshop on Motion and Video Computing (MOTION'02), pp. 175-180, Orlando, USA, Dec. 5-6, 2002.
Haritaoglu et al., "W4S : A real-time system for detecting and tracking people in 2<1/2>D", ECCV 98—5th European conference on computer vision, vol. 1407, pp. 877-892, Freiburg , Germany, Jun. 2-6, 1998.
Harville, M., "Stereo Person Tracking with Short and Long Term Plan-View Appearance Models of Shape and Color", Proceedings of the IEEE International Conference on Advanced Video and Signal-Based Surveillance (AVSSS-2005), pp. 522-527, Como, Italy, Sep. 15-16, 2005.
Holte, M., "Fusion of Range and Intensity Information for View Invariant Gesture Recognition", IEEE Conference on Computer Vision and Pattern Recognition Workshops (CVPRW '08), pp. 1-7, Anchorage, USA, Jun. 23-28, 2008.
Kaewtrakulpong et al., "An Improved Adaptive Background Mixture Model for Real-Time Tracking with Shadow Detection", Proceedings of the 2nd European Workshop on Advanced Video Based Surveillance Systems (AVBS'01), Kingston, UK, Sep. 2001.
Kolb et al., "ToF-Sensors: New Dimensions for Realism and Interactivity", Proceedings of the IEEE Conference on Computer Vision and Patter Recognition Workshops, pp. 1-6, Anchorage, USA, Jun. 23-28, 2008.
Kolsch et al., "Fast 2D Hand Tracking with Flocks of Features and Multi-Cue Integration", IEEE Workshop on Real-Time Vision for Human Computer Interaction (at CVPR'04), Washington, USA, Jun. 27-Jul. 2, 2004.
Krumm et al., "Multi-Camera Multi-Person Tracking for EasyLiving", 3rd IEEE International Workshop on Visual Surveillance, Dublin, Ireland, Jul. 1, 2000.
Leens et al., "Combining Color, Depth, and Motion for Video Segmentation", ICVS 2009—7th International Conference on Computer Vision Systems, Liege, Belgium Oct. 13-15, 2009.
MacCormick et al., "Partitioned Sampling, Articulated Objects, and Interface-Quality Hand Tracking", ECC'00—Proceedings of the 6th European Conference on Computer Vision—Part II , pp. 3-19, Dublin, Ireland, Jun. 26-Jul. 1, 2000.
Malassiotis et al., "Real-Time Hand Posture Recognition Using Range Data", Image and Vision Computing, vol. 26, No. 7, pp. 1027-1037, Jul. 2, 2008.
Morano et al., "Structured Light Using Pseudorandom Codes", IEEE Transactions on Pattern Analysis and Machine Intelligence, vol. 20, issue 3, pp. 322-327, Mar. 1998.
Munoz-Salinas et al., "People Detection and Tracking Using Stereo Vision and Color", Image and Vision Computing, vol. 25, No. 6, pp. 995-1007, Jun. 1, 2007.
Nanda et al., "Visual Tracking Using Depth Data", Proceedings of the 2004 Conference on Computer Vision and Patter Recognition Workshop, vol. 3, Washington, USA, Jun. 27-Jul. 2, 2004.
Scharstein et al., "High-Accuracy Stereo Depth Maps Using Structured Light", IEEE Conference on Computer Vision and Patter Recognition, vol. 1, pp. 195-2002, Madison, USA, Jun. 2003.
Shi et al., "Good Features to Track", IEEE Conference on Computer Vision and Pattern Recognition, pp. 593-600, Seattle, USA, Jun. 21-23, 1994.
Siddiqui et al., "Robust Real-Time Upper Body Limb Detection and Tracking", Proceedings of the 4th ACM International Workshop on Video Surveillance and Sensor Networks, Santa Barbara, USA, Oct. 27, 2006.
Softkinetic S.A., IISU™—3D Gesture Recognition Platform for Developers of 3D Applications, Belgium, Brussels, 2007-2010.
Sudderth et al., "Visual Hand Tracking Using Nonparametric Belief Propagation", IEEE Workshop on Generative Model Based Vision at CVPR'04, Washington, USA, Jun. 27-Jul. 2, 2004.

Tsap, L., "Gesture-Tracking in Real Time with Dynamic Regional Range Computation", Real-Time Imaging, vol. 8, issue 2, pp. 115-126, Apr. 2002.
Xu et al., "A Multi-Cue-Based Human Body Tracking System", Proceedings of the 5ths International Conference on Computer Vision Systems (ICVS 2007), Germany, Mar. 21-24, 2007.
Xu et al., "Human Detecting Using Depth and Gray Images", Proceedings of the IEE Conference on Advanced Video and Signal Based Surveillance (AVSS'03), Miami, USA, Jul. 21-22, 2003.
Yilmaz et al., "Object Tracking: A Survey", ACM Computing Surveys, vol. 38, No. 4, article 13, Dec. 2006.
Zhu et al., "Controlled Human Pose Estimation From Depth Image Streams", IEEE Conference on Computer Vision and Patter Recognition Workshops, pp. 1-8, Anchorage, USA, Jun. 23-27, 2008.
International Application PCT/IB2010/051055 Search Report dated Sep. 1, 2010.
La Viola, J. Jr., "Whole-Hand and Speech Input in Virtual Environments", Computer Science Department, Florida Atlantic University, USA, 1996.
Martell, C., "Form: An Experiment in the Annotation of the Kinematics of Gesture", Dissertation, Computer and Information Science, University of Pennsylvania, 2005.
U.S. Appl. No. 12/352,622 Official Action dated Mar. 31, 2011.
Prime Sense Inc., "Prime Sensor™ NITE 1.1 Framework Programmer's Guide", Version 1.2, year 2009.
Primesense Corporation, "PrimeSensor Reference Design 1.08", USA, year 2010.
International Application PCT/IB2012/050577 filed on Feb. 9, 2012.
U.S. Appl. No. 61/615,403, filed Mar. 26, 2012.
U.S. Appl. No. 61/603,949, filed Feb. 28, 2012.
U.S. Appl. No. 61/525,771, filed Aug. 21, 2011.
U.S. Appl. No. 13/295,106, filed Nov. 14, 2011.
U.S. Appl. No. 61/538,970, filed Sep. 26, 2011.
U.S. Appl. No. 61/526,696, filed Aug. 24, 2011.
U.S. Appl. No. 61/526,692, filed Aug. 24, 2011.
U.S. Appl. No. 13/314,207, filed Dec. 8, 2011.
U.S. Appl. No. 13/314,210, filed Dec. 8, 2011.
International Application PCT/IB2011/053192 Search Report dated Dec. 6, 2011.
U.S. Appl. No. 12/352,622 Official Action dated Sep. 30, 2011.
Gordon et al., "The use of Dense Stereo Range Date in Augmented Reality", Proceedings of the 1st International Symposium on Mixed and Augmented Reality (ISMAR), Darmstadt, Germany, pp. 1-10, Sep. 30-Oct. 1, 2002.
Agrawala et al., "The two-user Responsive Workbench :support for collaboration through individual views of a shared space", Proceedings on the 24th conference on computer graphics and interactive techniques (SIGGRAPH 97), Los Angeles, USA, pp. 327-332 , Aug. 3-8, 1997.
Harman et al., "Rapid 2D-to 3D conversion", Proceedings of SPIE Conference on Stereoscopic Displays and Virtual Reality Systems, vol. 4660, pp. 78-86, Jan. 21-23, 2002.
Hoff et al., "Analysis of head pose accuracy in augmented reality", IEEE Transactions on Visualization and Computer Graphics, vol. 6, No. 4, pp. 319-334, Oct.-Dec. 2000.
Poupyrev et al., "The go-go interaction technique: non-liner mapping for direct manipulation in VR", Proceedings of the 9th annual ACM Symposium on User interface software and technology (UIST '96), Washington, USA, pp. 79-80, Nov. 6-8, 1996.
Wexelblat et al., "Virtual Reality Applications and Explorations", Academic Press Inc., San Diego, USA, 262 pages, year 1993.
U.S. Appl. No. 13/161,508 Office Action dated Apr. 10, 2013.
U.S. Appl. No. 12/683,452 Office Action dated Jun. 7, 2013.
Galor, M., U.S. Appl. No. 13/778,172 "Asymmetric Mapping in Tactile and Non-Tactile User Interfaces" filed Feb. 27, 2013.
Berenson et al., U.S. Appl. No. 13/904,050 "Zoom-based gesture user interface" filed May 29, 2013.
Berenson et al., U.S. Appl. No. 13/904,052 "Gesture-based interface with enhanced features" filed May 29, 2013.
Bychkov et al., U.S. Appl. No. 13/849,514 "Gaze-enhanced Virtual Touchscreen" filed Mar. 24, 2013.
Guendelman et al., U.S. Appl. No. 13/849,514 "Enhanced Virtual Touchpad" filed Mar. 24, 2013.
U.S. Appl. No. 13/423,322 Office Action dated Nov. 1, 2013.
U.S. Appl. No. 13/423,314 Office Action dated Dec. 4, 2013.

* cited by examiner ively stored, which instructions to implement the present invention provide methods # VIRTUAL KEYBOARD FOR A NON-TACTILE THREE DIMENSIONAL USER INTERFACE

CROSS-REFERENCE TO RELATED APPLICATION

This application claims the benefit of U.S. Provisional Patent Application 61/386,591, filed Sep. 27, 2010, which is incorporated herein by reference.

FIELD OF THE INVENTION

This invention relates generally to user interfaces for computerized systems, and specifically to user interfaces that are based on three-dimensional sensing.

BACKGROUND OF THE INVENTION

Many different types of user interface devices and methods are currently available. Common tactile interface devices include a computer keyboard, a mouse and a joystick. Touch screens detect the presence and location of a touch by a finger or other object within the display area. Infrared remote controls are widely used, and "wearable" hardware devices have been developed, as well, for purposes of remote control.

Computer interfaces based on three-dimensional (3D) sensing of parts of a user's body have also been proposed. For example, PCT International Publication WO 03/071410, whose disclosure is incorporated herein by reference, describes a gesture recognition system using depth-perceptive sensors. A 3D sensor, typically positioned in a room in proximity to the user, provides position information, which is used to identify gestures created by a body part of interest. The gestures are recognized based on the shape of the body part and its position and orientation over an interval. The gesture is classified for determining an input into a related electronic device.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

As another example, U.S. Pat. No. 7,348,963, whose disclosure is incorporated herein by reference, describes an interactive video display system, in which a display screen displays a visual image, and a camera captures 3D information regarding an object in an interactive area located in front of the display screen. A computer system directs the display screen to change the visual image in response to changes in the object.

SUMMARY OF THE INVENTION

There is provided, in accordance with an embodiment of the present invention a method, including presenting, by a computer system executing a non-tactile three dimensional user interface, a virtual keyboard on a display, the virtual keyboard including multiple virtual keys, capturing a sequence of depth maps over time of a body part of a human subject, presenting, on the display, a cursor at positions indicated by the body part in the captured sequence of depth maps, and selecting one of the multiple virtual keys in response to an interruption of a motion of the presented cursor in proximity to the one of the multiple virtual keys.

There is also provided, in accordance with an embodiment of the present invention an apparatus, including a display, and a computer executing a non-tactile three dimensional user interface and configured to present a virtual keyboard on a display, the virtual keyboard including multiple virtual keys, to capture a sequence of depth maps over time of a body part of a human subject, to present, on the display, a cursor at positions indicated by the body part in the captured sequence of depth maps, and to select one of the multiple virtual keys in response to an interruption of a motion of the presented cursor in proximity to the one of the multiple virtual keys.

There is further provided, in accordance with an embodiment of the present invention a computer software product including a non-transitory computer-readable medium, in which program instructions are stored, which instructions, when read by a computer executing a non-tactile three dimensional user interface, cause the computer present a virtual keyboard on a display, the virtual keyboard including multiple virtual keys, to capture a sequence of depth maps over time of a body part of a human subject, to present, on the display, a cursor at positions indicated by the body part in the captured sequence of depth maps, and to select one of the multiple virtual keys in response to an interruption of a motion of the presented cursor in proximity to the one of the multiple virtual keys.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Figure 1:
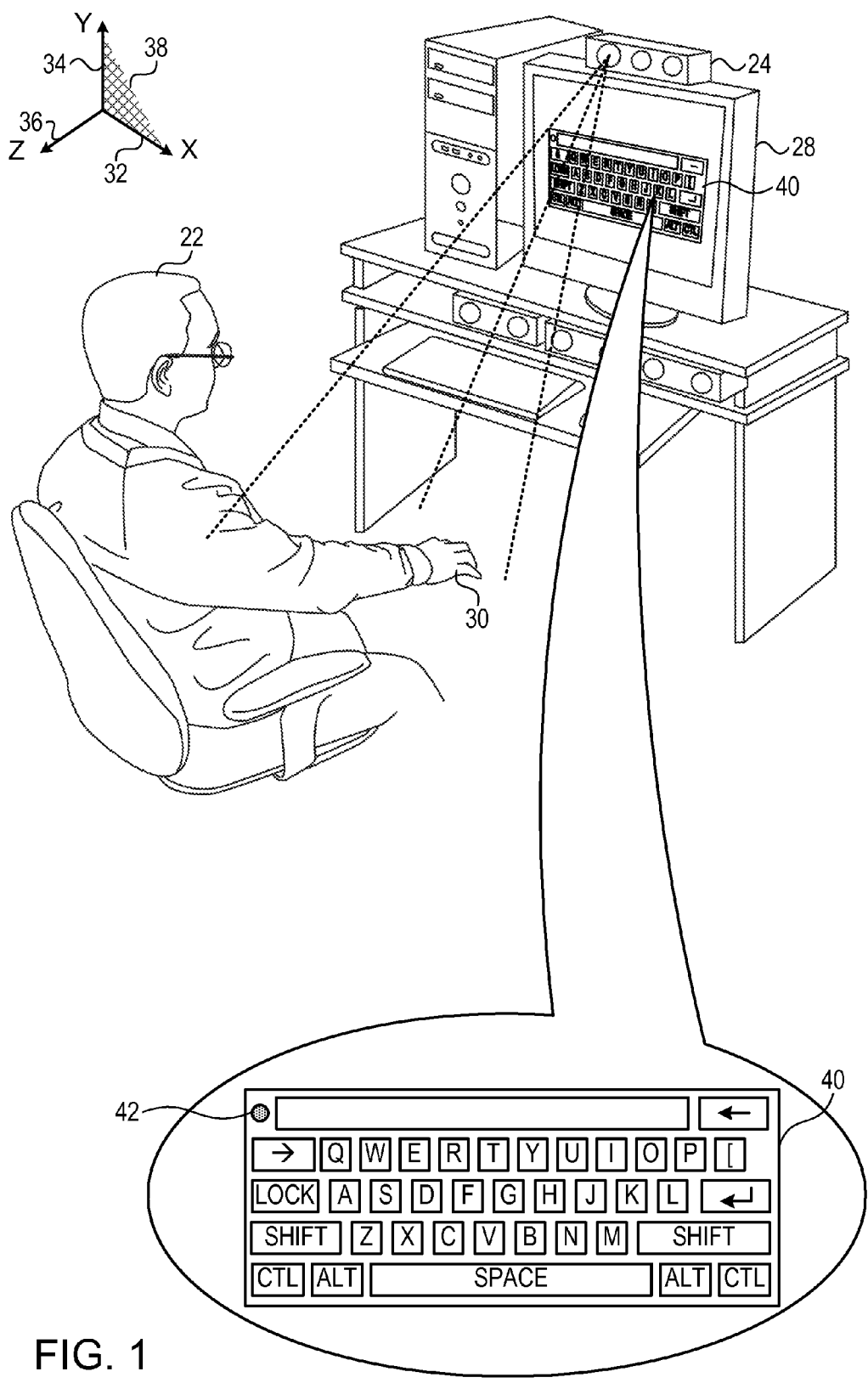
FIG. 1 is a schematic pictorial illustration of a system configured to implement a virtual keyboard for a non-tactile three dimensional user interface, in accordance with an embodiment of the present invention.

Computer keyboards typically comprise an arrangement of physical keys which act electronic switches. Despite the development of alternative input devices such as mice, touchscreens and pen devices, computer keyboards remain a commonly used versatile device for direct input into computers.

When using a tactile input device such as a computer keyboard, a user typically presses the physical keys in order to convey alphanumeric text and system commands (e.g., an Enter key or cursor keys) to a computer coupled to the keyboard. However, when interacting with a non-tactile 3D user interface (also referred to herein as a 3D user interface), the user may perform gestures in mid-air, and perform the gestures from different positions within a field of view of a 3D sensor coupled to the 3D user interface.

Embodiments of the present invention provide methods and systems for conveying input to a non-tactile 3D user interface via a virtual keyboard presented on a display. The virtual keyboard may comprise multiple virtual keys that represent alphanumeric characters (i.e., "A"-"Z" and "0"-"9"), symbol characters (e.g., "@" and "+"), punctuation characters and control commands (e.g., an Enter key, and cursor and function keys). The virtual keyboard may also comprise a box that is configured to present any text or other characters that were input by the user via the virtual keyboard. In the description and in the claims, the term "virtual keyboard" is to be understood as a graphic representation of a keyboard that does not operate tactilely, and is presented on a display.

The 3D user interface can be configured to track the user's hand (or any other limb), and to position a cursor on a display at positions indicated by the hand's position. In one embodiment, the user can input a given virtual key by keeping the hand relatively steady as the cursor is presented over the given virtual key for a specified time period. In an additional embodiment, the specified time period may be shortened if a language model indicates that given virtual key is predicted based on previously entered virtual keys. For example, if the user previously entered the letters "bl", and then positions the cursor over the virtual key "i", the 3D user interface may accept the letter "i" after the cursor is presented in proximity to the virtual key "i" for a shorter specified time period, (e.g., 0.2 seconds). The 3D user interface can accept the letter "i" after the shorter time period since the language model can identify "bli" as first characters in the words "blink", "blind", etc. However, if after entering the letters "bl", the user positions the cursor over the virtual key "z", then the 3D user interface may accept "z" after the cursor is positioned over the virtual key "z" for a longer specified time period (e.g., one second).

In an alternative embodiment, as the user makes a smooth change of direction of a trajectory of the hand, the 3D user interface can apply a language model to select a given virtual key that the user intended to input. For example, if the letters "bac" were previously input by the user, and the user changes the direction of the hand's trajectory as the cursor is presented in the vicinity of virtual keys "i", "o", "j" and "k", the language model can select the letter "k", thereby completing the word "back".

Utilizing a language model can provide a best guess of the user's intended input that enables the user to enter characters (i.e., via the virtual keyboard) more rapidly. Additionally, the smooth change of direction is natural during fast text input, and may have ergonomic advantages.

System Description

FIG. 1 is a schematic, pictorial illustration of a non-tactile 3D user interface 20 (also referred to herein as the 3D user interface) for operation by a user 22 of a computer 26, in accordance with an embodiment of the present invention. The non-tactile 3D user interface is based on a 3D sensing device 24 coupled to the computer, which captures 3D scene information of a scene that includes the body or at least a body part, such as a hand 30, of the user. Device 24 or a separate camera (not shown in the figures) may also capture video images of the scene. The information captured by device 24 is processed by computer 26, which drives a display 28 accordingly.

Computer 26, executing 3D user interface 20, processes data generated by device 24 in order to reconstruct a 3D map of user 22. The term "3D map" refers to a set of 3D coordinates measured with reference to a generally horizontal X-axis 32, a generally vertical Y-axis 34 and a depth Z-axis 36, based on device 24. The set of 3D coordinates can represent the surface of a given object, in this case the user's body. In operation, user 22 moves hand 30 in an X-Y plane 38 to interact with a virtual keyboard 40 and a cursor 42, which are both presented on the display.

In one embodiment, device 24 projects a pattern of spots onto the object and captures an image of the projected pattern. Computer 26 then computes the 3D coordinates of points on the surface of the user's body by triangulation, based on transverse shifts of the spots in the pattern. Methods and devices for this sort of triangulation-based 3D mapping using a projected pattern are described, for example, in PCT International Publications WO 2007/043036, WO 2007/105205 and WO 2008/120217, whose disclosures are incorporated herein by reference. Alternatively, interface 20 may use other methods of 3D mapping, using single or multiple cameras or other types of sensors, as are known in the art.

Computer 26 is configured to capture, via 3D sensing device 24, a sequence of depth maps over time. Each of the depth maps comprises a representation of a scene as a two-dimensional matrix of pixels, where each pixel corresponds to a respective location in the scene, and has a respective pixel depth value that is indicative of the distance from a certain reference location to the respective scene location. In other words, pixel values in the depth map indicate topographical information, rather than a brightness level and/or a color of any objects in the scene. For example, depth maps can be created by detecting and processing an image of an object onto which a laser speckle pattern is projected, as described in PCT International Publication WO 2007/043036 A1, whose disclosure is incorporated herein by reference.

In some embodiments, computer 26 can process the depth maps in order to segment and identify objects in the scene. Specifically, computer 26 can identify objects such as humanoid forms (i.e., 3D shapes whose structure resembles that of a human being) in a given depth map, and use changes in the identified objects (i.e., from scene to scene) as input for controlling computer applications.

For example, PCT International Publication WO 2007/132451, whose disclosure is incorporated herein by reference, describes a computer-implemented method where a given depth map is segmented in order to find a contour of a humanoid body. The contour can then be processed in order to identify a torso and one or more limbs of the body. An input can then be generated to control an application program running on a computer by analyzing a disposition of at least one of the identified limbs in the captured depth map.

In some embodiments, computer 26 can process captured depth maps in order to track a position of hand 30. By tracking the hand position, 3D user interface 20 can use hand 30 as a pointing device in order to control the computer or other devices such as a television and a set-top box. Additionally or alternatively, 3D user interface 20 may implement "digits input", where user 22 uses hand 30 as a pointing device to select a digit presented on display 28. Tracking hand points and digits input are described in further detail in PCT International Publication WO IB2010/051055.

Computer 26 typically comprises a general-purpose computer processor, which is programmed in software to carry out the functions described hereinbelow. The software may be downloaded to the processor in electronic form, over a network, for example, or it may alternatively be provided on non-transitory tangible media, such as optical, magnetic, or electronic memory media. Alternatively or additionally, some or all of the functions of the image processor may be implemented in dedicated hardware, such as a custom or semi-custom integrated circuit or a programmable digital signal processor (DSP). Although computer 26 is shown in FIG. 1, by way of example, as a separate unit from sensing device 24, some or all of the processing functions of the computer may be performed by suitable dedicated circuitry within the housing of the sensing device or otherwise associated with the sensing device.

As another alternative, these processing functions may be carried out by a suitable processor that is integrated with display 28 (in a television set, for example) or with any other suitable sort of computerized device, such as a game console or media player. The sensing functions of device 24 may likewise be integrated into the computer or other computerized apparatus that is to be controlled by the sensor output.

Virtual Keyboard Interaction

Figure 2:
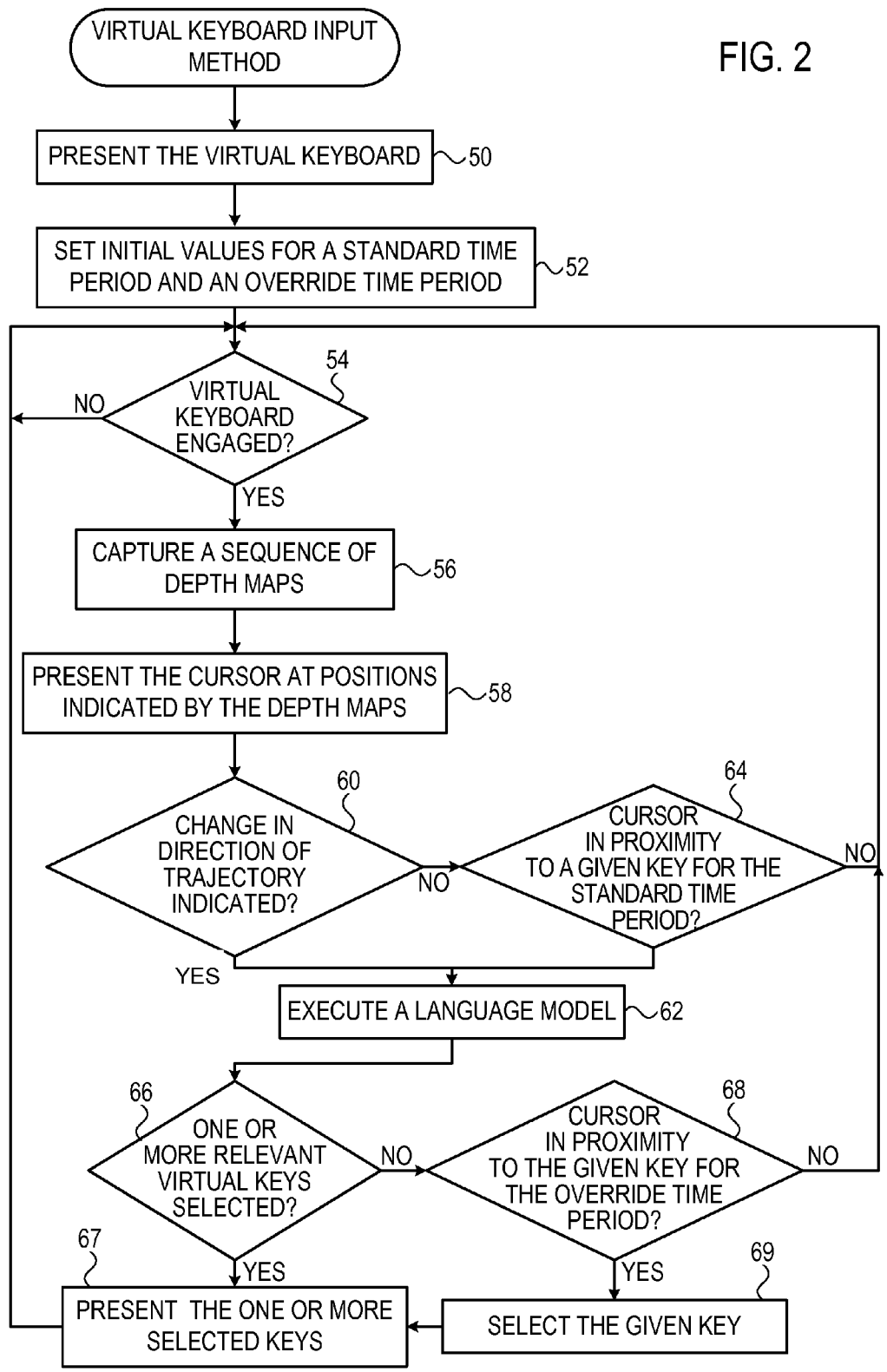
FIG. 2 is a flow diagram that schematically illustrates a method of interacting with the virtual keyboard, in accordance with an embodiment of the present invention.
Figure 3:
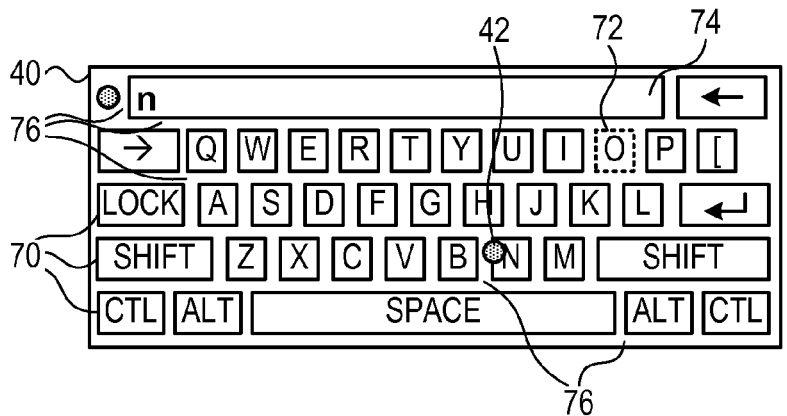
FIG. 3 is a schematic pictorial illustration of the virtual keyboard, in accordance with an embodiment of the present invention.
Figure 4:
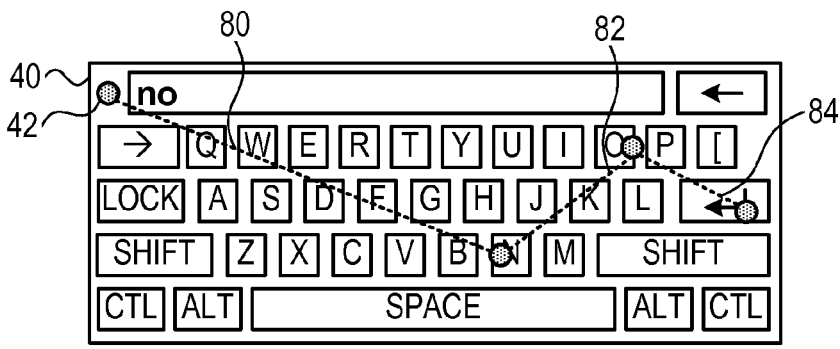
FIG. 4 is a schematic pictorial illustration of character input via the virtual keyboard, in accordance with an embodiment of the present invention.
Figure 5:
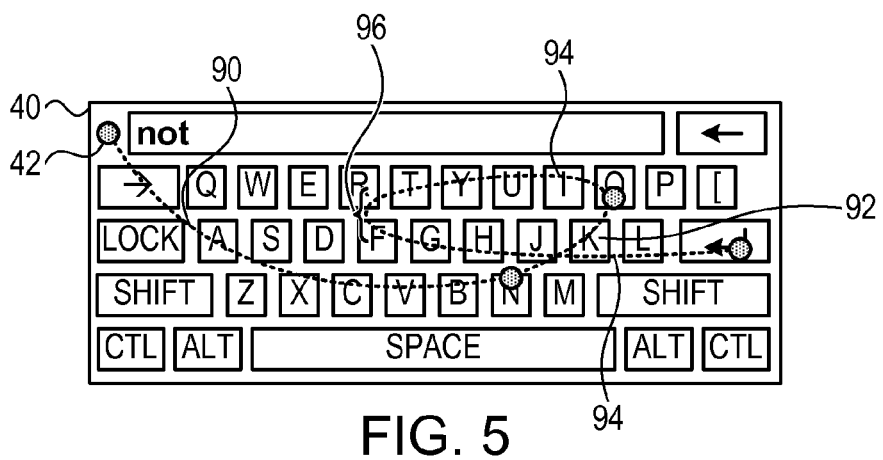
FIG. 5 is a schematic pictorial illustration of character input via the virtual keyboard, in accordance with an alternative embodiment of the present invention.

FIG. 2 is a flow diagram that schematically illustrates a method of character input using virtual keyboard 40, in accordance with an embodiment of the present invention, and FIG. 3 is a schematic pictorial illustration of the virtual keyboard, in accordance with an embodiment of the present invention. FIG. 4 is a schematic pictorial illustration of user 22 interacting with virtual keyboard 40, in accordance with the embodiment of the present invention, and FIG. 5 is a schematic pictorial illustration of the user interacting with the virtual keyboard, in accordance with an alternative embodiment of the present invention.

In a presentation step 50 in the flow diagram, 3D user interface 20 presents virtual keyboard 40 on display 28. In the configuration shown in FIG. 3, virtual keyboard 40 comprises virtual keys 70, which can be presented with a surrounding border 72. As user 22 selects one of virtual keys 70, which is alphanumeric, using the embodiments described herein, 3D user interface 20 can present the corresponding alphanumeric character in a text box 74.

Virtual keys 70 may comprise alphanumeric characters, a backspace key, a space bar, symbols and punctuation (e.g., "@" and "?"). Additionally virtual keys 70 may include control keys (e.g., an Enter key and cursor keys) and function keys (e.g., F1, F2, F3, etc.). In some embodiments, 3D user interface 20 can toggle the virtual keys between different modes (e.g., upper and lower case characters) and character sets (e.g., English, Arabic, Chinese and Hebrew). Additionally, the design of virtual keyboard 40 may include "empty" areas 76 between each of the virtual keys, so that user 22 can easily direct cursor 42 to an empty location, thereby reducing the probability of a false positive input.

Returning to the flow diagram, in an initialization step 52, computer 26 sets initial values for a standard time period and an override time period that can be used to by the 3D user interface for deciding when to accept a keystroke on virtual keyboard 40, as described in further detail hereinbelow. Typically, the standard time period is shorter than the override time period, and are both stored as parameters in 3D user interface 20.

In some embodiments, 3D user interface 20 can automatically adjust the standard and the override time periods in response to a proficiency of user 22. In other words, 3D user interface 20 can initially set the standard and the override time periods period to first values, and then modify the standard and the override time periods according to a skill level of user 22. In an embodiment, 3D user interface 20 may measure the user's skill level by calculating an average time interval that is required for the user to transition from a first given virtual key 70 to a second given virtual key 70 (e.g., from "a" to "t"). For example, for every five alphanumeric inputs (i.e., via the virtual keyboard) computer 26 can calculate the average time period between each of the inputs and classify the user's skill level to one of several (e.g., three) levels, where each of the levels is associated with different standard and override time period parameters.

Additionally or alternatively, 3D user interface 20 can adjust the specified time period using factors such as:
- A number of typing errors user 22 made using virtual keyboard 40. The number of errors may be recorded according to the number of times a "Backspace" virtual key is selected. For example, if user 22 has a high error rate, 3D user interface 20 can increase the specified time period.
- 3D user interface 20 can present a given virtual key 70 that is dedicated to changing the specified time period (e.g., a "+" or a "−" key).
- A unique specified time period that is associated with each user of 3D user interface 20.
- A profile of hand 30. For example, a closed hand can be associated with a shorter specified time period, and an open hand can be associated with a longer specified time period.

In a first comparison step 54, 3D user interface 20 waits for user 22 to engage virtual keyboard 40. If 3D user interface 20 is engaged, then in a capture step 56, computer 26 captures a sequence of depth maps of a body part such as hand 30.

To engage virtual keyboard 40 (i.e., so that user 22 can input characters via the virtual keyboard), user 22 can move hand 30 so that the 3D user interface presents cursor 42 within the presented virtual keyboard. To disengage from virtual keyboard 40, user 22 can move hand 30 randomly so that 3D user interface 20 does not present cursor 42 in the vicinity of any given virtual key 70 for more than the specified time period. Alternatively, user 22 can disengage from virtual keyboard 40 by moving hand 30 so that the 3D user interface presents cursor 42 outside virtual keyboard 40. In some embodiments, 3D user interface 20 can convey visual feedback when user 20 engages and disengages from virtual keyboard 40. For example, the 3D user interface can change the shading (or color) of virtual keyboard 40 when the user engages and disengages the virtual keyboard.

As discussed supra, user 22 can control cursor 42 by moving hand 30 (or any other limb) in X-Y plane 38, and select a given virtual key 70 by positioning hand 30 so that cursor 42 is positioned in proximity to the given virtual key (i.e., either over the given virtual key or within the border of the given virtual key) for the specified time period. As user 22 moves hand 30 in X-Y plane 38, 3D user interface 20, in a presentation step 58 presents cursor 42 at positions indicated by the hand in the captured sequence of depth maps.

In embodiments of the present invention, computer 26 selects one of virtual keys 70 upon the captured sequence of depth maps indicating an interruption of a motion of cursor 42 (i.e., in response to an interruption of a motion of hand 30 or any other body part) in proximity to the one of the multiple virtual keys. As described in detail hereinbelow, the interruption of the motion may comprise (a) user 30 maintaining hand 30 relatively stationary for either a standard or an override time period as computer 26 presents cursor 42 in proximity to the one of the multiple virtual keys, or (b) user 30 changes direction of hand 30 in proximity to the one of the multiple virtual keys.

In a second comparison step 60, if the captured sequence of depth maps indicate a specified change in direction of a trajectory of hand 30 (i.e., without the hand pausing for at least the standard time period), then in a model application step 62, computer 26 executes a language model that attempts to select one of virtual keys 70 that is in proximity to cursor 42 as the cursor changes direction. However, if the captured sequence of depth maps does not indicate a specified change in direction of a trajectory of hand 30, then the method continues with a third comparison step 64.

In the third comparison step, if user 22 keeps hand 30 relatively steady so that computer 26 presents cursor 42 in proximity to a given virtual key 70 (i.e., within border 72, or adjacent to the given virtual key) for the standard time period (e.g., 0.1 seconds), then the method continues with step 62, where the language model checks if a character associated with the given virtual key comprises a character predicted by the language model. However, if user 22 moves hand 30 so that computer 26 does not present cursor 42 in proximity to a given key 70 for the standard time period (i.e., less than the standard time period), then the method continues with step 54.

Typically, the language model executed in step 62 analyzes the virtual keys that are in proximity to cursor 42 as the cursor changes direction, and selects one or more virtual keys 70 that best appends to any text (i.e., a sequence of one or more virtual keys 70) previously selected and presented in text box 74. Note that there may be instances when the language model does not select any virtual key 70, if none of the virtual keys that are in proximity to cursor 42 as the cursor changes direction are sufficiently probable.

In some embodiments, the language model may apply rules specific to a given language (e.g., English), including but not limited to word rules, short phrase rules, parts of speech rules and grammatical rules. In additional embodiments the language model may utilize information on user 22 who is interacting with the virtual keyboard, including but not limited to a custom dictionary based on text previously entered by the user during a related input session (i.e., text input via the virtual keyboard or any other input device).

For example, if user 22 previously entered the words "Mozart" and "Beethoven" via virtual 40, the language model may set a parameter that indicates that the user prefers classical music. Therefore, if the user enters the word "Bavj" via the virtual keyboard, the language model may correct "Bavj" to "Bach" ("v" is adjacent to "c" and "j" is adjacent" and "h" on the virtual keyboard), even though "Bach" was not explicitly added to the dictionary during previous input session to the music selection field. Note that "navy" is another interpretation for similar motion (with a single key shift relative to the intended "Bach"), but will be less favorable by the language model, as previous text associated with classical music was already entered by the user.

In further embodiments, the language model may utilize an expected semantic domain. For example, the language model may select a response using a dictionary custom tailored to a question or a field type that 3D user interface 20 presents on display 28. In other words, the language model may utilize a custom dictionary specific to an application executing on computer 26. For example, if 3D user interface 20 presents an input field on display 28 for a movie title or a book title, the language model can utilize a dictionary of movie and/or book titles. As an additional example, if computer 26 is executing an adventure-type game, the language model can look for specific commands (e.g., RUN, STOP, FIRE, HIDE, etc.). As a further example, if 3D user interface is presenting a personal information form to be filled out by user 22, the language model can look for specific values for each field (e.g., "M" or "F" for the user's sex).

Examples of language models that can be implemented by computer 26 include a dictionary and statistical models including but not limited to a statistical dictionary, an n-gram model, a Markov model, and a dynamic Bayesian network. Language models are described in further detail in the book "Foundations of Statistical Natural Language Processing", by Christopher D. Manning and Hinrich Schütze, MIT Press, 1999, Chapters 6, 7, 9 and 12, which is incorporated herein by reference.

In a fourth comparison step 66, if computer 26 selects one or more relevant (i.e., to the language model) virtual keys 70 that are in proximity to cursor 42 (i.e., as the cursor either changes direction or is in proximity to the given virtual key for the standard time period), then the computer presents the one or more selected virtual keys in text box 74 as visual feedback in a presentation step 67, and the method continues with step 54. However, if computer 26 (i.e., since the language model did not select any of the virtual keys) does not select any virtual key 70 in the fourth comparison step, then the method continues with a fifth comparison step 68.

In the fifth comparison step, if user 22 keeps hand 30 relatively steady so that computer 26 presents cursor 42 in proximity to the given virtual key 70 (i.e., within border 72, or adjacent to the given virtual key) for the override time period (e.g., 0.5 seconds), then the computer selects the given virtual key in a selection step 69, and the method continues with step 67. However, if user 22 moves hand 30 so that computer 26 does not present cursor 42 in proximity to the given key 70 for the override time period, then the method continues with step 54.

In some embodiments, 3D user interface 20 can convey visual feedback to user 22 while selecting a given virtual key 70. For example, the 3D user interface can gradually change the shading (e.g., a gray level) of the given character presented on the given virtual key as user 22 maintains the cursor over the given virtual key. The 3D user interface can accept the given virtual key as an input when the shading reaches a certain level. Additionally or alternatively, 3D user interface 20 can increase the size of the given virtual key after the specified time period, thereby conveying an indication that the given virtual key is being "pressed".

In additional embodiments, user 22 can repeat the input of a given virtual key 70 twice (e.g., "tt") by keeping hand 30 relatively stationary so that the 3D user interface 20 maintains the cursor's position over the given virtual key twice as long as the relevant time period (i.e., either the standard or the override time periods). In a similar fashion, user 22 can repeat the input of the given virtual key three or more times. In alternative embodiments, 3D user interface 20 can limit the input of the given virtual key to a single character, regardless of how long cursor 42 is positioned over the given virtual key. To repeat the given virtual key, user 22 moves hand 30 to first position the cursor outside the border of the given virtual key, and then moves the hand a second time to position the cursor back within the border of the given virtual key.

In further embodiments, 3D user interface 20 can be configured to accelerate the rate of virtual keyboard 40 input by monitoring both hands 30 of user 22. The 3D user interface can measure separate distances between each hand 30 and 3D sensing device 24, and identify the hand closer to the 3D sensing device as active, and identify the other hand as inactive. Therefore, while "pressing" a given virtual key 70 with the active hand, the user can position the inactive hand above the next virtual key 70 that the user intends to "press".

When monitoring both hands of user 22, 3D user interface 20 may present either one or two cursors 42. When presenting a single cursor 42, 3D user interface 20 can toggle the cursor between the active and the inactive hand. In other words, 3D user interface 20 can first position cursor 42 in response to a position of the active hand. Once user 22 has selected a given virtual key 70 with the active hand, 3D user interface 20 can then position cursor 42 in response to a position of the inactive hand. When presenting two cursors 42, user interface 20 may position a first cursor 42 in response to a position of the active hand, and position a second cursor 42 in response to a position of the inactive hand.

FIG. 4 shows cursor 42 traversing path segments 80, 82 and 84 in response to user 22 moving hand 30 in X-Y plane 38, as the user enters the word "no" via virtual keyboard 40. Initially, computer 26 positions cursor 42 over the virtual keys "q" and "w". User 22 inputs the letter "n" by moving hand 30 in X-Y plane 38, so that 3D user interface 20 moves cursor 42 along path segment 80 to a position over the "n" virtual key. As user 22 keeps hand 30 relatively steady over the "n" virtual key for the standard time period, the 3D user interface accepts "n" as an input, and presents "n" in text box 74.

User 22 then inputs the letter "o" by moving hand 30 in X-Y plane 38, so that 3D user interface 20 moves cursor 42 along path segment 82 to a position over the "o" virtual key. As user 22 keeps hand 30 relatively steady over the "o" virtual key for the standard time period, the 3D user interface accepts "o" as an input and presents "o" in text box 74. Finally, user 22 presses the Enter virtual key by moving hand 30 in X-Y plane 38, so that 3D user interface 20 moves cursor 42 along path segment 84 to a position over the Enter virtual key. As user 22 keeps hand 30 relatively steady over the Enter virtual key for the standard time period, the 3D user interface accepts the Enter key as an input. Note that the example described in FIG. 4 uses the standard time period, since the word "no" is a word that can be predicted by a language model.

FIG. 5 shows cursor 42 traversing path segments 90, 92 and 94 in response to user 22 moving hand 30 in X-Y plane 38, as the user enters the word "not" via virtual keyboard 40. Initially, 3D user interface 20 positions cursor 42 over the virtual keys "q" and "w". User 22 inputs the letter "n" by moving hand 30 in X-Y plane 38, so that 3D user interface 20 moves cursor 42 along path segment 90 to a position over the "n" virtual key. As user 22 keeps hand 30 relatively steady over the "n" virtual key for the specified time period, the 3D user interface accepts "n" as an input, and presents "n" in text box 74.

User 22 then inputs the letter "o" by moving hand 30 in X-Y plane 38, so that 3D user interface 20 moves cursor 42 along path segment 92 to a position over the "o" virtual key. As user 22 keeps hand 30 relatively steady over the "o" virtual key for the specified time period, the 3D user interface accepts "o" as an input and presents "n" in text box 74.

After entering the letters "n" and "o", user 22 moves hand 30 in X-Y plane 38 so that 3D user interface 20 moves cursor 42 along a path 94 in response to the hand's movement. Using the captured sequence of depth maps, computer 26 calculates a point 96 along path segment 94, which indicates a change in direction of a trajectory of the cursor, as the cursor crosses over the virtual keys "t", "r", "f" and "c". Computer 26 applies a language model to resolve the ambiguity of multiple possible letters and selects the most likely virtual key 70 that user 22 intended to "press". In the example shown in FIG. 5, the language model evaluates the probability of the strings "not", "nor", "nof" and "noc", and identifies "not" as the most probable text string.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is

1. A method, comprising:
presenting, by a computer system executing a non-tactile three dimensional user interface, a virtual keyboard on a display, the virtual keyboard comprising multiple virtual keys;
capturing a sequence of depth maps, via a 3D capturing device, over time of a hand of a human subject while the human subject moves the hand in a plane;
presenting, on the display, a cursor at positions indicated by the hand in the captured sequence of depth maps such that the cursor moves over the virtual keys on the display in response to movement of the hand in the plane; and
selecting one of the multiple virtual keys if a change in direction of trajectory is determined by using the captured sequence of depth maps and calculating points along the presented cursor's trajectory path segment over the virtual keys, wherein the trajectory of the user's hand tracks a plurality of keys for which a cursor crosses spatially from a previously determined key point to a newly desired key point, and wherein the keys between the previously determined key point to the newly desired key point are used in combination with previously determined key inputs to configure a language model for estimating probable words and estimating a most likely key from the keys based on the language model and displaying the most likely key appended with the previously determined key inputs; and wherein if the change of trajectory is not detected then determining whether the cursor is in proximity to a plurality of keys for a standard time period and selecting keys to be used by the language model for estimating a most likely key from the plurality of keys and displaying the most likely key appended with the previously determined key inputs.

2. The method according to claim 1, wherein selecting one of the multiple virtual keys comprises using a language model.

3. The method according to claim 2, wherein the language model is selected from a list consisting of a dictionary, a statistical dictionary, an n-gram model, a Markov model and a dynamic Bayesian network.

4. The method according to claim 2, wherein the language model applies rules specific to a given language.

5. The method according to claim 4, wherein the rules are selected from a list consisting of word rules, short phrase rules, parts of speech rules and grammatical rules.

6. The method according to claim 2, wherein the language model utilizes a custom dictionary based on text previously entered by a user interacting with the non-tactile three dimensional user interface.

7. The method according to claim 2, wherein the language model utilizes a custom dictionary specific to an application executing on the computer system.

8. The method according to claim 2, and comprising the language model selecting none of the virtual keys if none of the virtual keys that are in proximity to the cursor are sufficiently probable.

9. The method according to claim 1, and comprising presenting visual feedback of the selected one of the multiple virtual keys on the display.

10. The method according to claim 1, wherein each of the multiple virtual keys is selected from a list consisting of alphanumeric characters, symbol characters, punctuation characters and control commands.

11. The method according to claim 1, wherein presenting the cursor in proximity to the one of the multiple virtual keys comprises presenting the cursor within a border surrounding the one of the multiple virtual keys.

12. The method according to claim 1, and comprising conveying visual feedback upon presenting the cursor in proximity to the one of the multiple virtual keys.

13. The method according to claim 1, and comprising conveying visual feedback when a user engages and disengages from the virtual keyboard.

14. An apparatus, comprising:
a display; and
a computer executing a non-tactile three dimensional user interface and configured to present a virtual keyboard on a display, the virtual keyboard comprising multiple virtual keys, to capture a sequence of depth maps, via a 3D capturing device, over time of a hand of a human subject while the human subject moves the hand in a plane, to present, on the display, a cursor at positions indicated by the hand in the captured sequence of depth maps such that the cursor moves over the virtual keys on the display in response to movement of the hand in the plane, and to select one of the multiple virtual keys if a change in direction of trajectory is determined by using the captured sequence of depth maps and calculating points along the presented cursor's trajectory path segment over the virtual keys, wherein the trajectory of the user's hand tracks a plurality of keys for which a cursor crosses spatially from a previously determined key point to a newly desired key point, and wherein the keys between the previously determined key point to the newly desired key point are used in combination with previously determined key inputs to configure a language model for estimating probable words and estimating a most likely key from the keys based on the language model and displaying the most likely key appended with the previously determined key inputs; and wherein if the change of trajectory is not detected then determining whether the cursor is in proximity to a plurality of keys for a standard time period and selecting keys to be used by the language model for estimating a most likely key from the plurality of keys and displaying the most likely key appended with the previously determined key inputs.

15. The apparatus according to claim 14, wherein the computer is configured to select one of the multiple virtual keys by using a language model.

16. The apparatus according to claim 15, wherein the computer is configured to select the language model from a list consisting of a dictionary, a statistical dictionary, an n-gram model, a Markov model and a dynamic Bayesian network.

17. The apparatus according to claim 15, wherein the language model applies rules specific to a given language.

18. The apparatus according to claim 17, wherein the computer is configured to select the rules from a list consisting of word rules, short phrase rules, parts of speech rules and grammatical rules.

19. The apparatus according to claim 15, wherein the language model utilizes a custom dictionary based on text previously entered by a user interacting with the non-tactile three dimensional user interface.

20. The apparatus according to claim 15, wherein the language model utilizes a custom dictionary specific to an application executing on the computer system.

21. The apparatus according to claim 15, wherein the computer is configured to select none of the virtual keys if none of the virtual keys that are in proximity to the cursor are sufficiently probable.

22. The apparatus according to claim 14, wherein the computer is configured to present visual feedback of the selected one of the multiple virtual keys on the display.

23. The apparatus according to claim 14, wherein the computer is configured to select each of the multiple virtual keys from a list consisting of alphanumeric characters, symbol characters, punctuation characters and control commands.

24. The apparatus according to claim 14, wherein the computer is configured to present the cursor in proximity to the one of the multiple virtual keys by presenting the cursor within a border surrounding the one of the multiple virtual keys.

25. The apparatus according to claim 14, wherein the computer is configured to conveying visual feedback upon presenting the cursor in proximity to the one of the multiple virtual keys.

26. The apparatus according to claim 14, wherein the computer is configured to conveying visual feedback when a user engages and disengages from the virtual keyboard.

27. A computer software product comprising a non-transitory computer-readable medium, in which program instructions are stored, which instructions, when read by a computer executing a non-tactile three dimensional user interface, cause the computer:
to present a virtual keyboard on a display, the virtual keyboard comprising multiple virtual keys, to capture a sequence of depth maps, via a 3D capturing device, over time of a hand of a human subject while the human subject moves the hand in a plane, to present on the display, a cursor at positions indicated by the hand in the captured sequence of depth maps such that the cursor moves over the virtual keys on the display in response to movement of the hand in the plane, and to select one of the multiple virtual keys if a change in direction of trajectory is determined by using the captured sequence of depth maps and calculating points along the presented cursor's trajectory path segment over the virtual keys, wherein the trajectory of the user's hand tracks a plurality of keys for which a cursor crosses spatially from a previously determined key point to a newly desired key point, and wherein the keys between the previously determined key point to the newly desired key point are used in combination with previously determined key inputs to configure a language model for estimating probable words and estimating a most likely key from the keys based on the language model and displaying the most likely key appended with the previously determined key inputs; and wherein if the change of trajectory is not detected then determining whether the cursor is in proximity to a plurality of keys for a standard time period and selecting keys to be used by the language model for estimating a most likely key from the plurality of keys and displaying the most likely key appended with the previously determined key inputs.

\* \* \* \* \*